United States Patent
Neelis

(10) Patent No.: US 6,767,057 B2
(45) Date of Patent: Jul. 27, 2004

(54) VEHICLE ANCHORAGE SYSTEM FOR CHILD SEAT

(75) Inventor: Jeffrey C. Neelis, Brighton, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/244,971

(22) Filed: Sep. 17, 2002

(65) Prior Publication Data

US 2004/0051356 A1 Mar. 18, 2004

(51) Int. Cl.$^7$ .............................................. B60N 2/28
(52) U.S. Cl. .................. 297/253; 297/216.11; 297/472
(58) Field of Search .......................... 297/253, 216.11, 297/250.1, 470, 471, 472

(56) References Cited

U.S. PATENT DOCUMENTS

| | | | | |
|---|---|---|---|---|
| 894,052 | A | * | 7/1908 | Radtke ........................ 297/471 |
| 3,198,288 | A | * | 8/1965 | Presunka .................... 188/377 |
| 3,744,814 | A | * | 7/1973 | Sturman ..................... 297/471 |
| 3,973,650 | A | * | 8/1976 | Nagazumi ................... 188/371 |
| 4,215,900 | A | * | 8/1980 | Coult .......................... 297/254 |
| 5,639,144 | A | * | 6/1997 | Naujokas ............... 297/216.11 |
| 5,685,603 | A | | 11/1997 | Lane, Jr. ................. 297/216.11 |
| 6,082,818 | A | | 7/2000 | Muller ..................... 297/250.1 |
| 6,267,442 | B1 | * | 7/2001 | Shiino et al. ................ 297/254 |
| 6,361,115 | B1 | * | 3/2002 | Aufrere et al. ........ 297/256.16 |
| 6,517,154 | B2 | * | 2/2003 | Sawamoto ............. 297/216.11 |

\* cited by examiner

*Primary Examiner*—Peter R. Brown
(74) *Attorney, Agent, or Firm*—Laura C. Hargitt

(57) ABSTRACT

A vehicle has a vehicle structure including a vehicle seat having a seat back and a seat cushion intersecting at a seat bight. A vehicle anchorage system for securing a child seat on the vehicle seat comprises two lower anchorage assemblies each having a fixed member secured to the vehicle structure, an anchor having a latchable portion for releasable engagement with a lower child seat tether hook at the seat bight, and an energy absorbing mechanism operable above a predetermined force threshold to provide a limited forward displacement of the anchor and the lower child seat tether hook. The vehicle anchorage system also includes an upper anchorage assembly having a fixed portion secured to the vehicle structure, a latchable portion for releasable engagement with an upper child seat tether hook, and an energy absorbing mechanism operable above a second predetermined force threshold to provide a limited forward displacement of the latchable portion and the upper child seat tether hook.

6 Claims, 12 Drawing Sheets

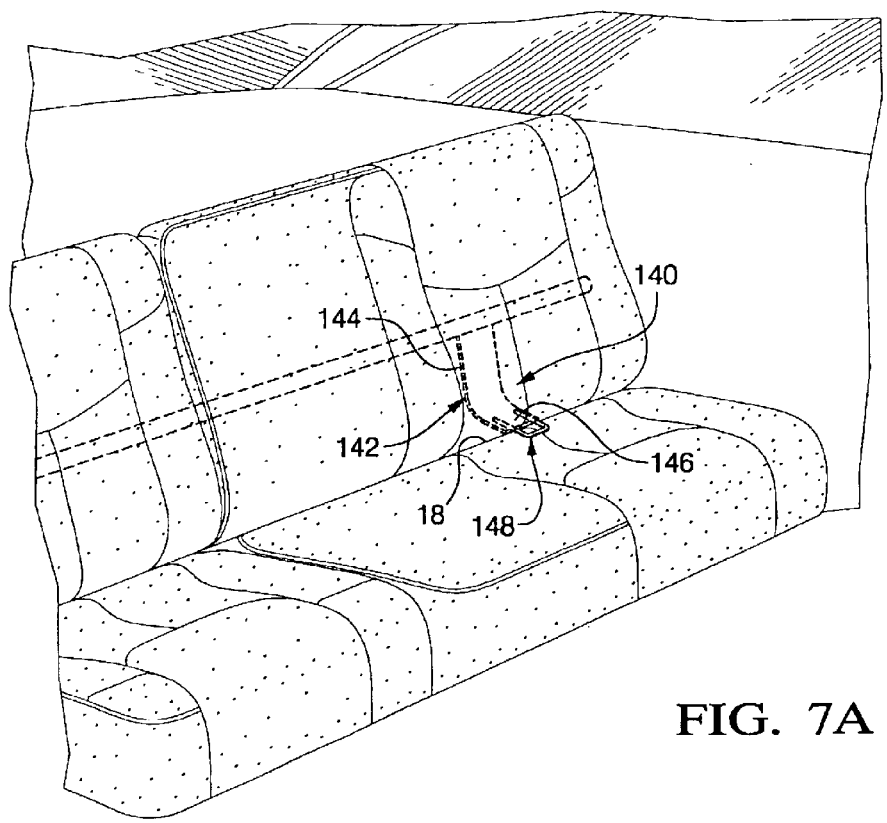
FIG. 7A
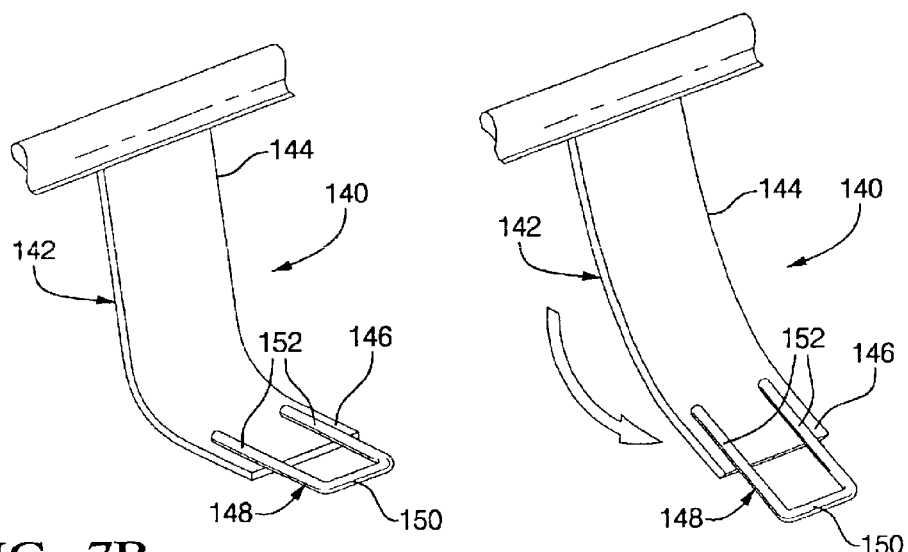
FIG. 7B          FIG. 7C

US 6,767,057 B2

VEHICLE ANCHORAGE SYSTEM FOR CHILD SEAT

TECHNICAL FIELD

The present invention is a vehicle anchorage system for installation of a child seat in a vehicle.

BACKGROUND OF THE INVENTION

Recently the National Highway Traffic and Safety Administration (NHTSA) enacted federal regulation Federal Motor Vehicle Safety Standard (FMVSS) 225. This standard establishes requirements for child restraint anchorage systems to aid consumers in proper installation of a child seat. Three tether anchorages are permanently installed in the vehicle, each to accept a child seat tether hook and strap. Two lower anchorages protrude from the seat bight, meaning the area close to and including the intersection of the vehicle seat cushion and seat back. One upper anchorage accepts a child seat tether hook connected to an upper portion of the child seat back.

SUMMARY OF THE INVENTION

The present invention is a vehicle anchorage system for securing a child seat on a vehicle seat. The vehicle anchorage system comprises two lower anchorage assemblies each having a fixed member secured to the vehicle structure, an anchor having a latchable portion at the seat bight for releasable engagement with a lower child seat tether hook, and an energy absorbing mechanism operable above a first predetermined force threshold to absorb energy and provide a limited forward displacement of the anchor and thus the child seat.

The vehicle anchorage system also includes an upper anchorage assembly having a fixed portion secured to the vehicle structure, a latchable portion for releasable engagement with an upper child seat tether hook, and an energy absorbing mechanism operable above a second predetermined force threshold to provide a limited forward displacement of the latchable portion and the upper child seat tether hook.

BRIEF DESCRIPTION OF THE DRAWINGS

FIG. 7A is a perspective view of a fifth embodiment installed in a vehicle seat.

FIG. 7B is a perspective view of the invention of FIG. 7A.

FIG. 7C is a perspective view of the invention of FIG. 7B shown in an activated state.

DESCRIPTION OF THE PREFERRED EMBODIMENT

Figure 1:
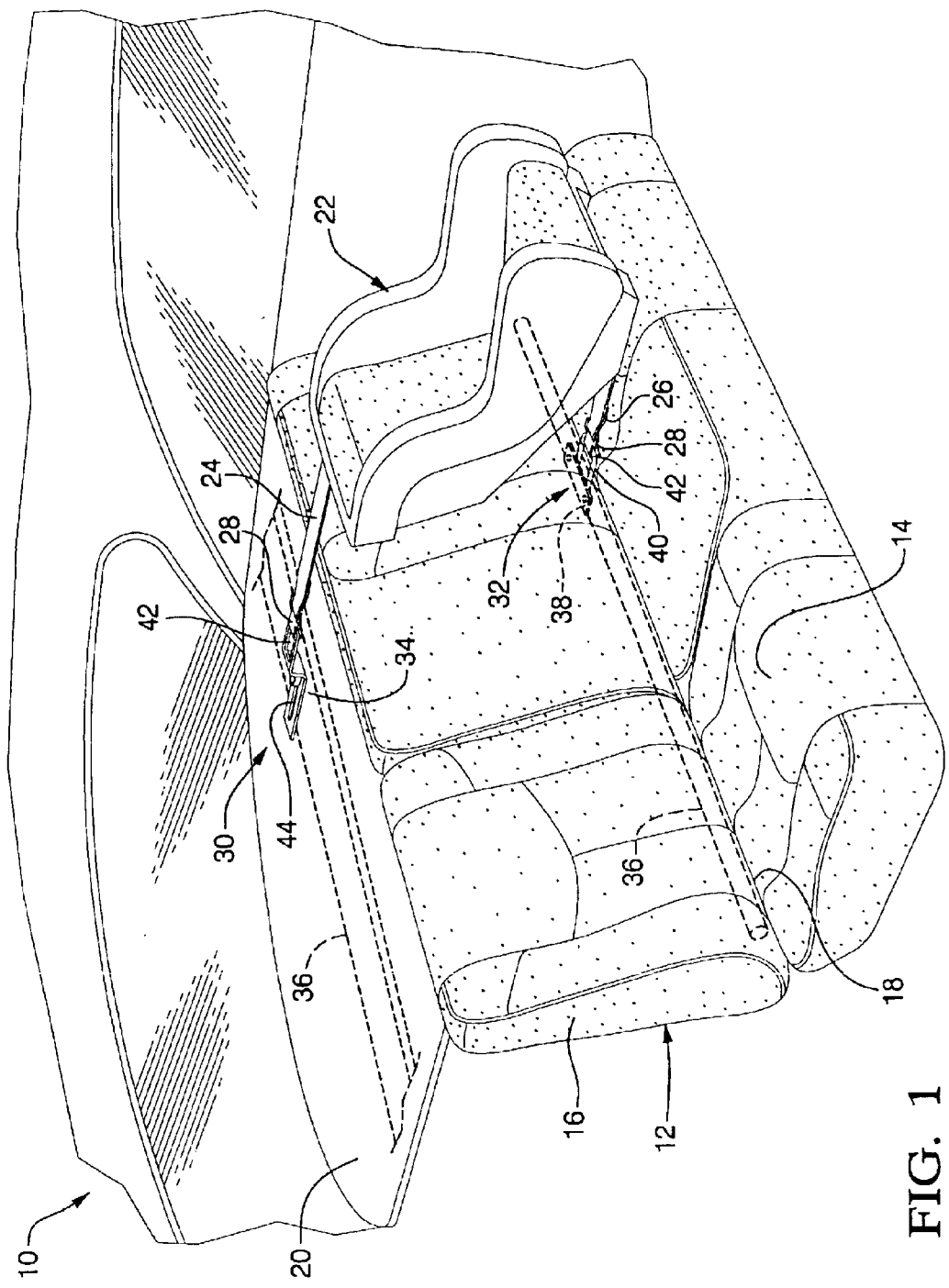
FIG. 1 illustrates a perspective view of a child seat secured on a vehicle seat under normal travel conditions.

Referring to FIG. 1, a portion of a vehicle 10 is shown with a vehicle seat 12 comprised of a seat cushion 14 and a seat back 16 intersecting at the seat bight 18. A rear package shelf 20 extends rearward from an upper end of the vehicle seat back 16 in the sedan-type vehicle illustrated. Such a package shelf would not be present in a utility vehicle. Directional descriptors used in this specification are with reference to the vehicle. Positioned on the vehicle seat 12 is a child restraint seat 22.

The child seat 22 is equipped with an upper tether 24 fixed to an upper portion of the child seat and two lower tethers 26 fixed to a lower portion of the child seat; each tether includes a latch mechanism 28 on its free end. The child seat 22 is releaseably latched to the vehicle 10 through an anchorage system 30 of the present invention.

The anchorage system 30 includes two common lower anchorage assemblies 32 (only one is shown) to accommodate the child seat lower tether hooks and one upper anchorage assembly 34 to accommodate the upper tether hook. Both anchorage assemblies are rigidly attached to vehicle structure 36, which may include seat frame structure.

Figure 2:
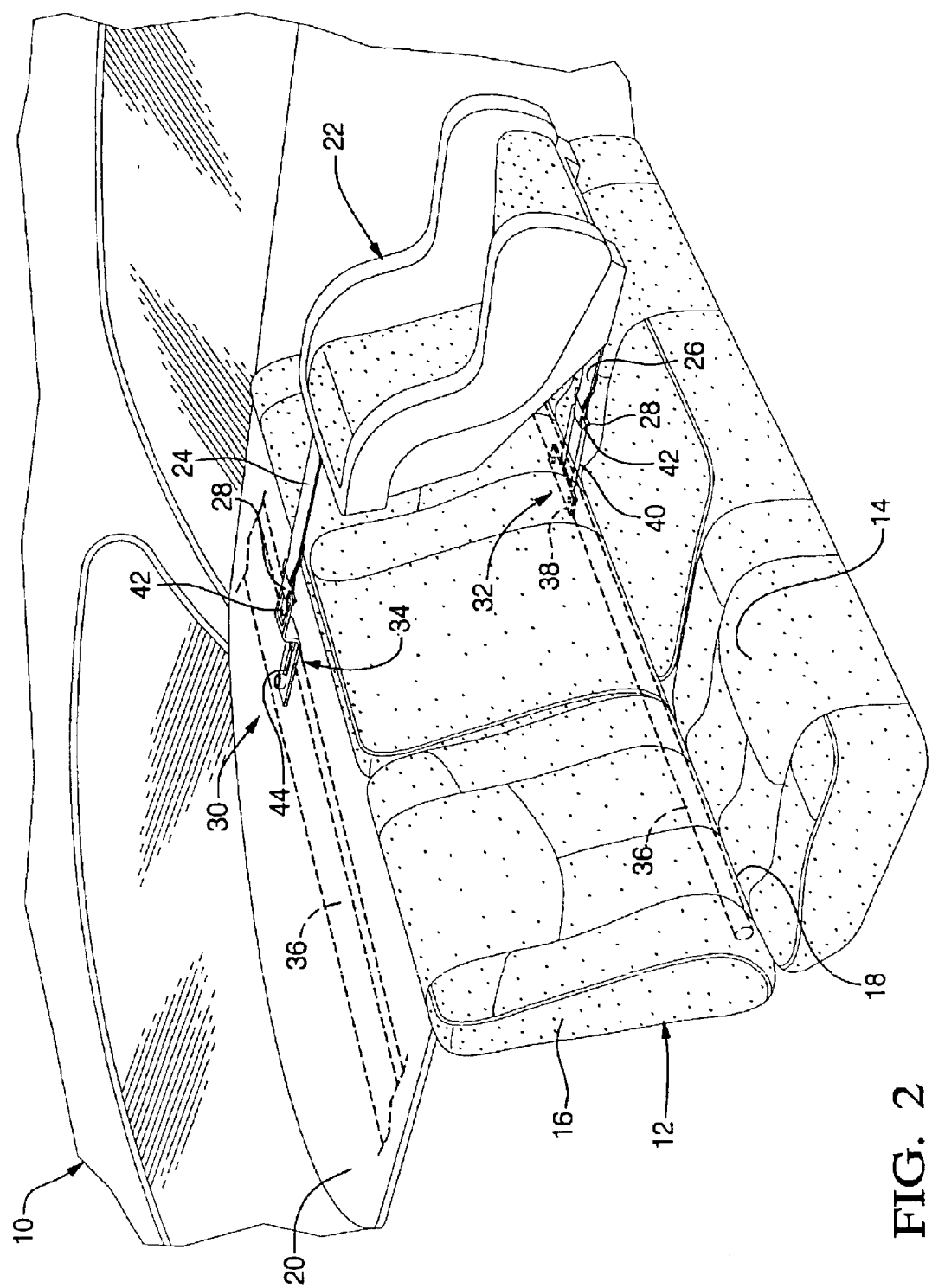
FIG. 2 illustrates an activated child seat anchorage system of the present invention.

The anchorage assemblies each include two primary components: a fixed member 38 secured to the vehicle structure and an anchor 40 having a latchable portion 42 for releasable engagement with the child seat tether hook 28. In addition, the anchorage assemblies may include an energy absorption (EA) mechanism 44. The EA mechanism is activated above a predetermined force threshold to provide a controlled and limited forward displacement of the child seat as shown in FIG. 2. The energy absorbing mechanism absorbs a portion of the kinetic energy imparted to the child seat system during a forward vehicle collision and thus operates to gradually decelerate the child seat system. The energy absorbing mechanism may operate for example by compressing a gas, fluid, and/or solid material, deforming a material, or overcoming a frictional surface.

Lower Anchorage Assembly

Figure 3A:
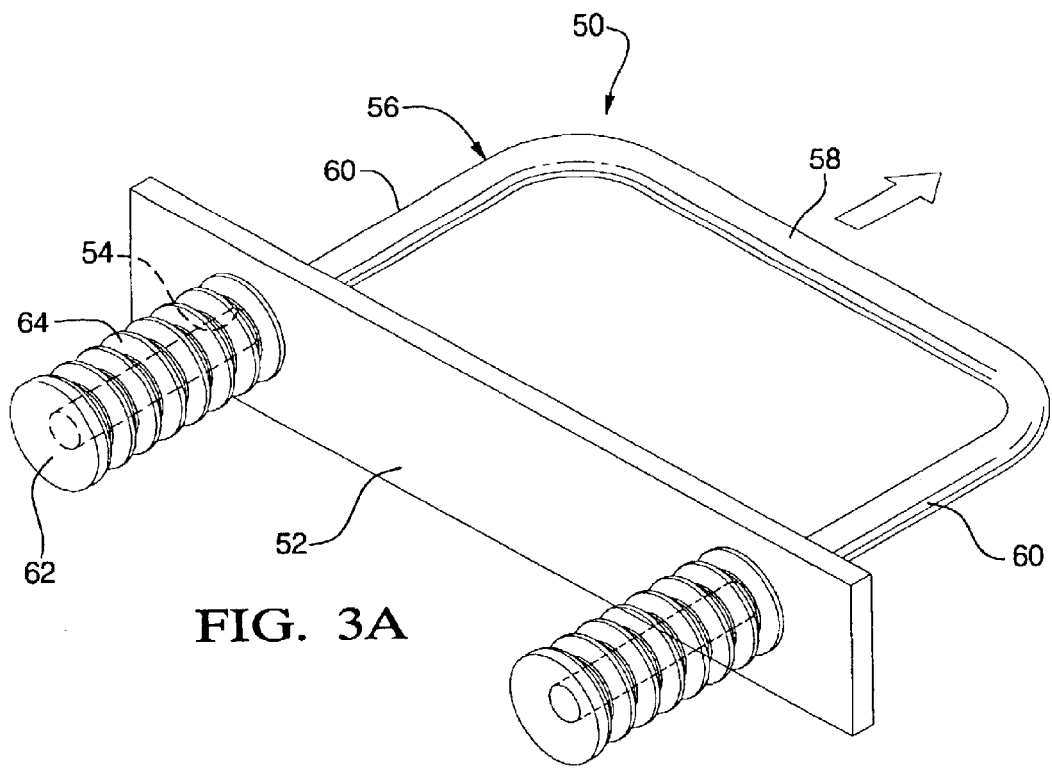
FIG. 3A illustrates a perspective view of a first embodiment of a lower anchorage assembly of the present invention.
Figure 3B:
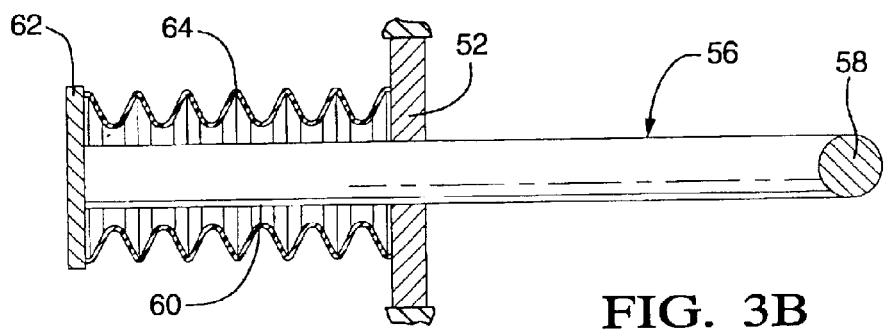
FIG. 3B is a side view of the invention shown in FIG. 3A.
Figure 3C:
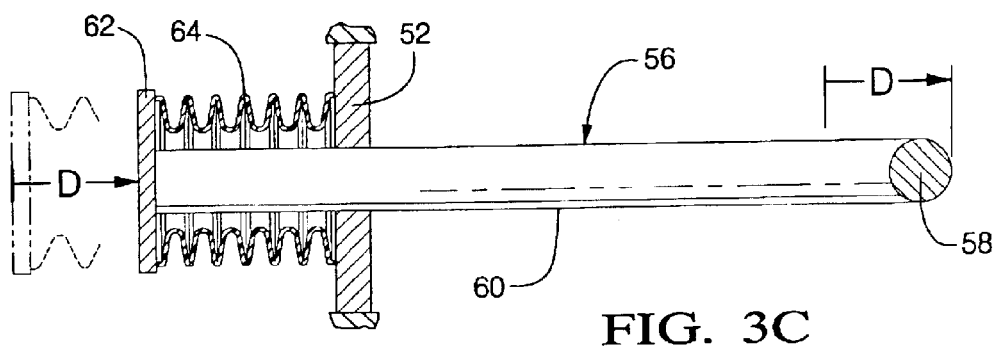
FIG. 3C is a side view of the invention in FIG. 3B shown in an activated state.

The discussion will now turn to specific embodiments to accomplish the energy absorbing lower anchorage assembly. As shown in FIGS. 3A–C, a lower anchorage assembly 50 (note that only one of the two lower anchorage assemblies is illustrated) includes a steel attachment bracket 52, which is rigidly secured to the vehicle structure such as by welding or bolting. Two apertures 54 extend through opposite ends of the attachment bracket 52.

The lower anchorage assembly 50 further includes a steel, C-shaped anchor 56 approximately six millimeters in diameter and having a latchable portion 58 for releasable engagement with the corresponding child seat latch mechanism, not shown, and two legs 60 slideably extending through the apertures 54 in the attachment bracket 52. The anchor legs 60 may slide relative to the attachment bracket. A steel disk 62 is welded to each end of the C-shaped anchor 56. Disposed between the fixed attachment bracket 52 and each of the anchor disk ends 62 is a hollow bellow 64 encircling each leg 60 of the anchor 56.

The two bellows 64 have characteristics which are selected to permit compression of the bellows in response to a predetermined amount of force applied to the bellows. The key characteristics of the bellows are strength of material, thickness of the material, and size of the pleats in the bellows. Preferably, the two bellows are made of metal. Prior to activation of the energy absorbing mechanism, the bellows have a relaxed, non-compressed length.

The child seat 22 is secured onto the vehicle seat 12 by latching the lower tethers 26 to the latchable portion of the lower anchors and latching the upper tether 24 to the upper anchorage assembly as shown in FIG. 1. A child, not shown is secured within the child seat by the child restraint mechanism associated with the child seat.

During normal vehicle travel, the bellows 64 in their relaxed, non-compressed state are sufficiently rigid to resist movement of the child seat. During a collision event, the inertia of the child seat system generates a forwardly force on the anchors 56 and thus to the bellows 64 through the disks 62 acting as a reaction portion. If this force is below a predetermined force level, then the bellows 64 do not compress and the child seat is prevented from moving forwardly relative to the vehicle seat as the anchor position is maintained.

If the predetermined forward force between the disks 62 and the bellows 64 is exceeded, then the bellows are compressed, the anchor 56 slides forward relative to the attachment bracket 52, and the child seat is accordingly displaced toward the position shown in FIG. 2. The child seat may travel a distance d until the bellows are completely compressed between the disks 62 and the attachment bracket 52.

The compression of the bellows is not instantaneous but instead occurs over a period of time providing a more gradual deceleration on the child seat. Further, the bellows absorb energy during compression because deformation of the material of the bellows occurs as each of the pleats of the bellows are flattened.

Figure 4A:
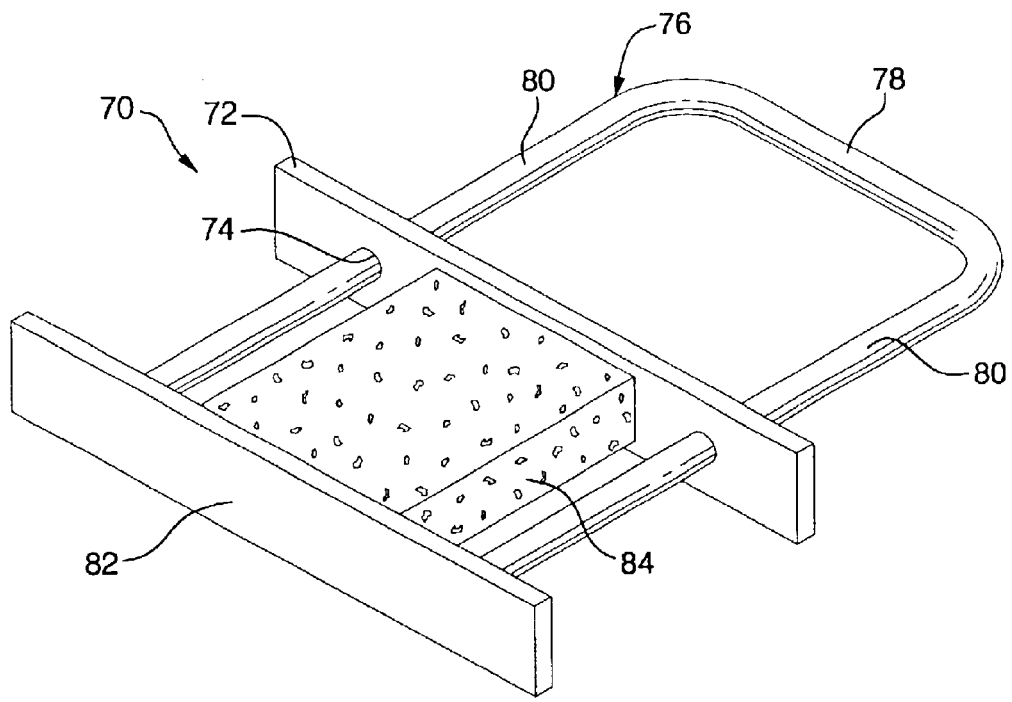
FIG. 4A is a perspective view of a second embodiment of a lower anchorage assembly.

FIGS. 4A and B illustrate a second variation for absorbing energy by compressing a material. A lower anchorage assembly 70 includes a steel attachment bracket 72, which is rigidly secured to the vehicle structure such as by welding or bolting. Two apertures 74 extend through opposite ends of the attachment bracket 72. The lower anchorage assembly 70 further includes a steel, C-shaped anchor 76 approximately six millimeters in diameter and having a latchable portion 78 for releasable engagement with the corresponding child seat latch mechanism, not shown, and two legs 80 slideably extending through the apertures 74 in the attachment bracket 72. The anchor legs 80 may slide relative to the attachment bracket 72. A steel reaction plate 82 extends from one end to the other of the anchor legs 80 and is welded thereto. Disposed between and adjacent to the fixed attachment bracket 72 and the reaction plate 82 is a block of sacrificial compressible material 84. The block 84 may be attached with adhesive to either the reaction plate 82 or to the attachment bracket 72 with no appreciable air gaps or preferably, the block is attached to both members.

The block 84 of sacrificial compressible material has characteristics, which are selected to permit compression of the block in response to a predetermined amount of force applied thereto. The key characteristics of the sacrificial block are strength of material, thickness of the material, and compression efficiency. The sacrificial block may be made from expanded polystyrene or polypropylene foam, urethane foam, expanded metal or plastic. Prior to activation of the energy absorbing mechanism, the block has a relaxed, non-compressed length.

During normal vehicle travel, the block 84 is sufficiently rigid to resist movement of the child seat. During a collision event, the inertia of the child seat system generates a forwardly force against the block 84 applied through the reaction plate 82 from the anchor 76. If this force is below a predetermined force level, then the block 84 does not compress and the child seat is prevented from moving forwardly relative to the vehicle seat.

Figure 4B:
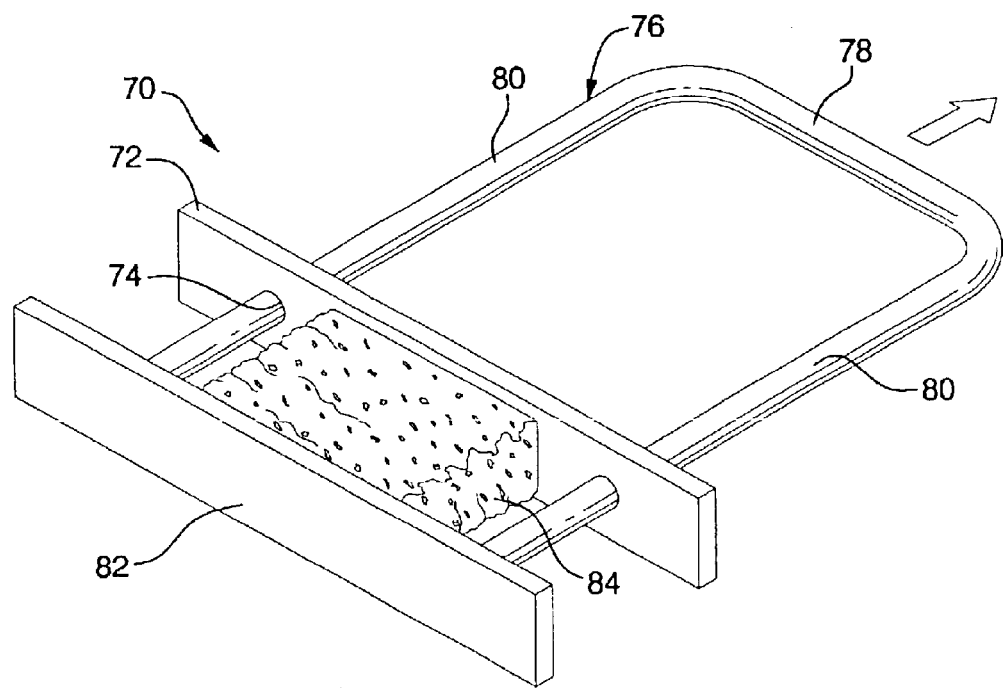
FIG. 4B is a perspective view of the invention of FIG. 4A shown in an activated state.

If the predetermined forward force between the reaction plate 82 and the block 84 is exceeded, then the block is compressed, the anchor 76 slides forward relative to the attachment bracket 72, and the child seat is accordingly displaced toward the position shown in FIG. 4B. The child seat may travel until the block 84 is completely compressed between the reaction plate 82 and the attachment bracket 72.

The compression of the block occurs over a period of time providing a gradual deceleration on the child seat. Further, the block absorbs energy during compression because deformation of the material occurs as it is flattened.

Figure 5A:
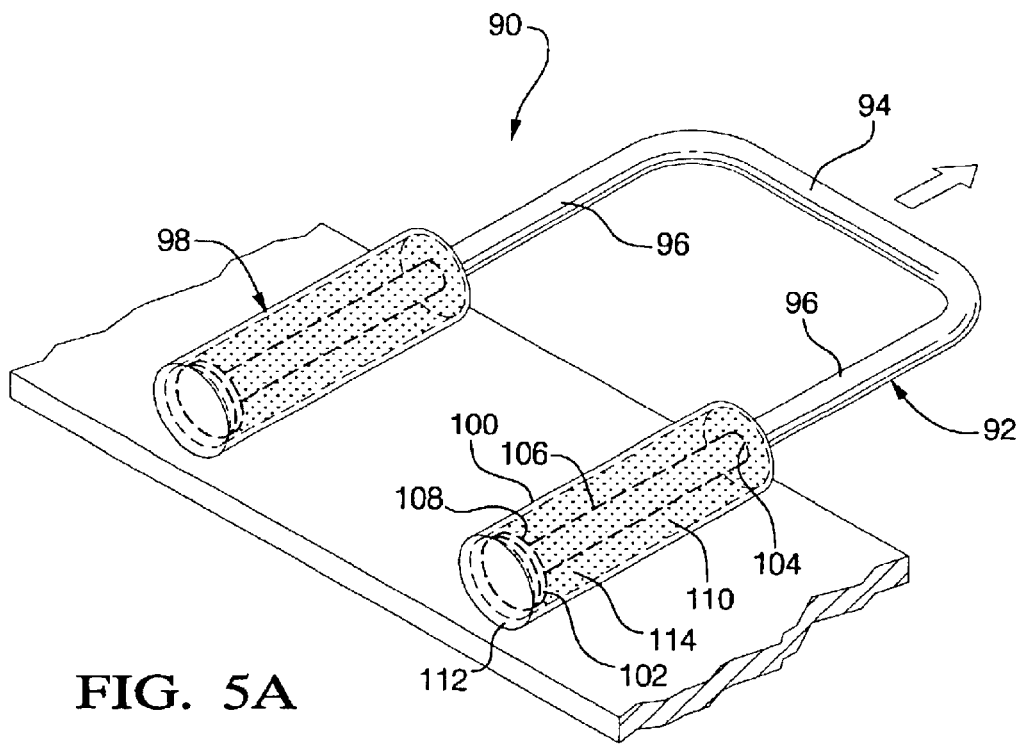
FIG. 5A is a perspective view of a third embodiment of a lower anchorage assembly.
Figure 5B:
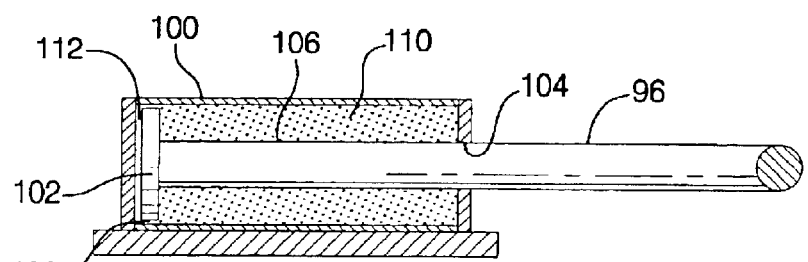
FIG. 5B is a side view of the invention shown in FIG. 5A.
Figure 5C:
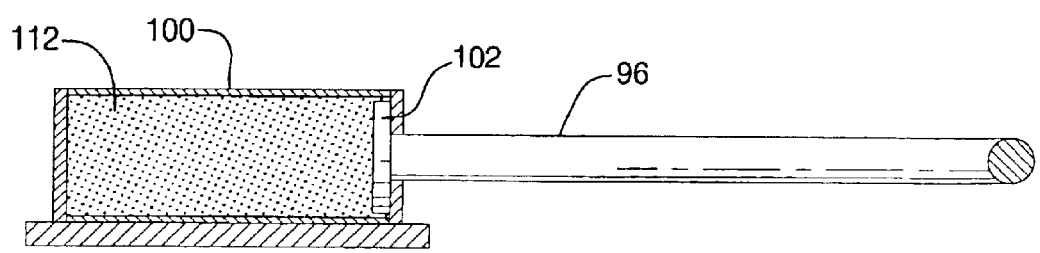
FIG. 5C is a side view of the invention in FIG. 5B shown in an activated state.

In the third embodiment shown in FIGS. 5A–C, the energy absorbing mechanism operates by displacing or compressing fluid. Here a lower anchorage assembly 90 includes a steel, C-shaped anchor 92 approximately six millimeters in diameter and having a latchable portion 94 for releasable engagement with the corresponding child seat latch mechanism, not shown, and two legs 96.

The lower anchorage assembly 90 further includes two piston assemblies 98 each having a closed cylinder 100 and a piston 102 disposed therein. The cylinder 100 is a fixed member rigidly attached to the vehicle seat frame or vehicle structure. The free ends of the anchor legs and a portion of the legs 96 extend through sealed holes 104 in the cylinder 100, attaching to the piston 102 to act as a piston stem 106. The annular gap between the piston and cylinder or a restrictive orifice 108 in the piston 102 provides fluid communication between the first and second chambers 110, 112 respectively. Fluid 114 is disposed in the first chamber 110. The fluid may be any suitable type of fluid having a predetermined viscosity.

During normal vehicle travel, the viscosity of the fluid and the size of the piston orifice 108 are such to resist movement of the piston and thus the anchor is held firmly in position to resist movement of the child seat. During a collision event, the inertia of the child seat generates a compressive force on the fluid 114. If this force is below a predetermined force level, then the piston 102 does not displace fluid to the second chamber 112 and the child seat is prevented from moving forwardly relative to the vehicle seat.

If the predetermined forward force of the piston 102 and anchor 92 on the fluid 114 is exceeded, then the fluid is displaced through the orifice 108, the anchor 92 travels forward relative to the cylinder 100, as does the child seat. The child seat may travel until the piston reaches the end of the cylinder as shown in FIG. 5C.

Alternatively, the fluid may be a compressible fluid sealed within the first chamber and providing the same energy absorption function as described when the piston compresses the fluid.

The movement of the anchor and piston occurs over a period of time. As the piston moves forward through the fluid, it must overcome the fluid forces. Some of the energy absorbed by the piston overcoming the fluid flow is kinetic energy.

Figure 6A:
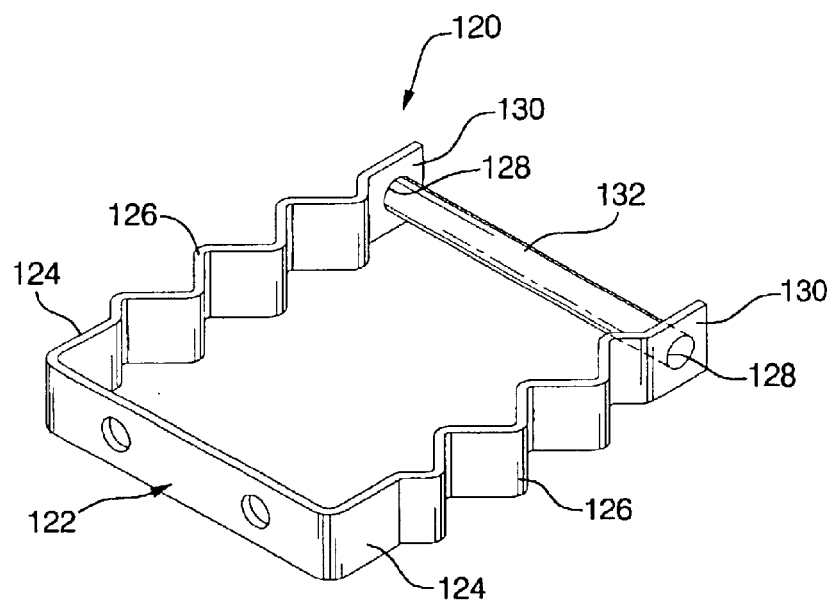
FIG. 6A is a perspective view of a fourth embodiment of a lower anchorage assembly.
Figure 6B:
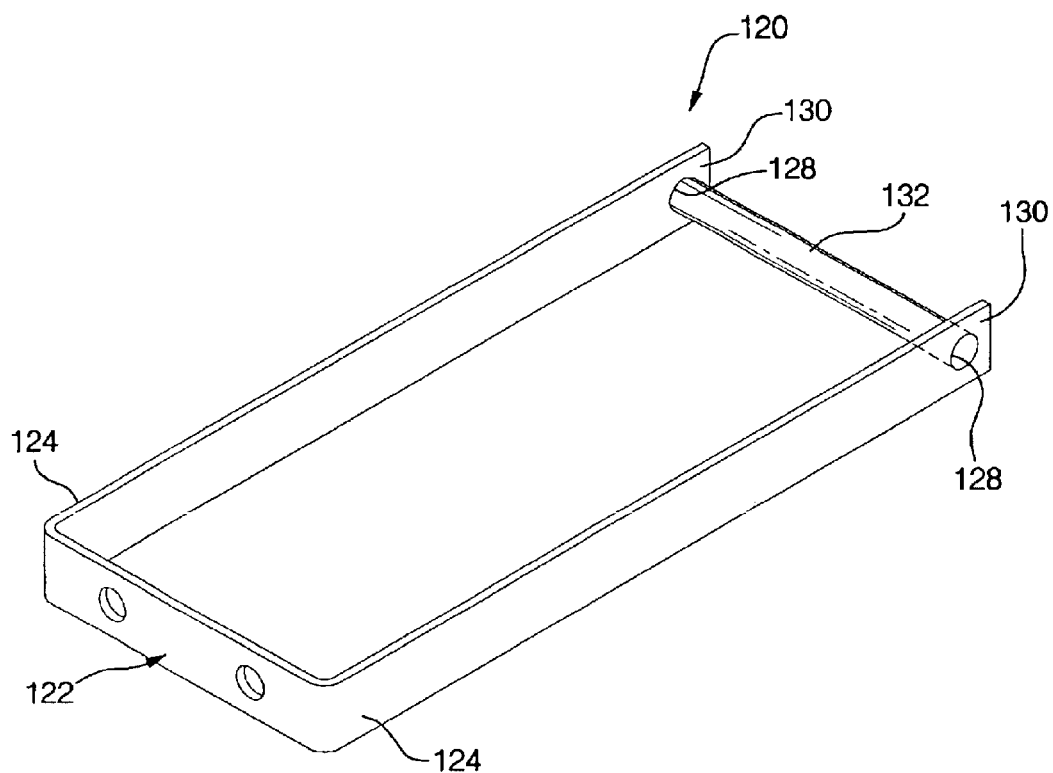
FIG. 6B is a perspective view of the invention of FIG. 6A shown in an activated state.

FIGS. 6A–B illustrate a fourth embodiment where the EA mechanism operates by straightening a material.

The lower anchorage assembly 120 includes a C-shaped steel attachment bracket 122, which is rigidly secured to the vehicle structure such as by welding or bolting at the attachment portion. The bracket includes two legs 124 having corrugated pleats 126 and a through-hole 128 at the free end 130. A steel anchor post 132 approximately six millimeters in diameter extends between the two legs 124 of the attachment bracket 122 through the through-holes 128 and is welded to the bracket.

The corrugated pleats 126 of the attachment bracket 122 have characteristics, which are selected to permit straightening of the pleats in response to a predetermined amount of force applied through the anchor 132. The key characteristics of the steel attachment bracket are thickness, elongation and yield strength.

During normal vehicle travel, the pleats 126 are folded and are sufficiently rigid to resist movement of the child seat. During a collision event, the inertia of the child seat system generates a forwardly extension force on the free ends 132 of the attachment bracket legs 124 applied from the anchor post 132. If this force is below a predetermined force level, then the pleats do not unfold and the child seat is prevented from moving forwardly relative to the vehicle seat.

If the predetermined extension force on the pleats 126 is exceeded, then the pleats are straightened, the anchor post 132 travels forward relative to the attachment bracket 122, and the child seat is accordingly displaced. The child seat may travel until the pleats are completely unfolded.

The straightening of the corrugated pleats in the attachment bracket is not instantaneous but instead occurs over a period of time providing a gradual deceleration on the child seat. As the metal yields and straightens each pleat, energy is absorbed.

A lower anchorage assembly 140, which is a fifth embodiment of the present invention, is shown in FIGS. 7A–C. It includes an L-shaped steel attachment bracket 142, which is rigidly secured at its upper end 144 to a vehicle seat back frame member such as by welding or bolting and a lower end 146 extending through the seat bight 18. A steel, C-shaped anchor 148 approximately six millimeters in diameter has a latchable portion 150 for releasable engagement with the corresponding child seat latch mechanism, not shown, and two legs 152 welded to the lower end of the attachment bracket. The L-shaped attachment bracket 142 is designed to yield and straighten the L-shaped bend in response to a predetermined amount of force applied by the anchor. The key characteristics of the bracket are elongation and yield strength, material properties, thickness and shape.

During normal vehicle travel, the L-shaped bracket 142 is sufficiently rigid to resist movement of the child seat. During a collision event, the inertia of the child seat system generates a forwardly extension force on the lower end 146 of the bracket by the anchor 148. If this force is below a predetermined force level, then the bracket 142 does not deform and the child seat is prevented from moving forwardly relative to the vehicle seat.

If the predetermined forward force is exceeded, then the L-shaped bracket 142 is straightened, allowing the anchor 148 to move forward relative to the upper fixed end 144 of the attachment bracket, and the child seat to be displaced accordingly toward the position shown in FIG. 7C. The child seat may travel until the L-shaped bracket is completely straightened. At which point, the bracket has absorbed the maximum amount of energy it can by deforming.

Figure 8A:
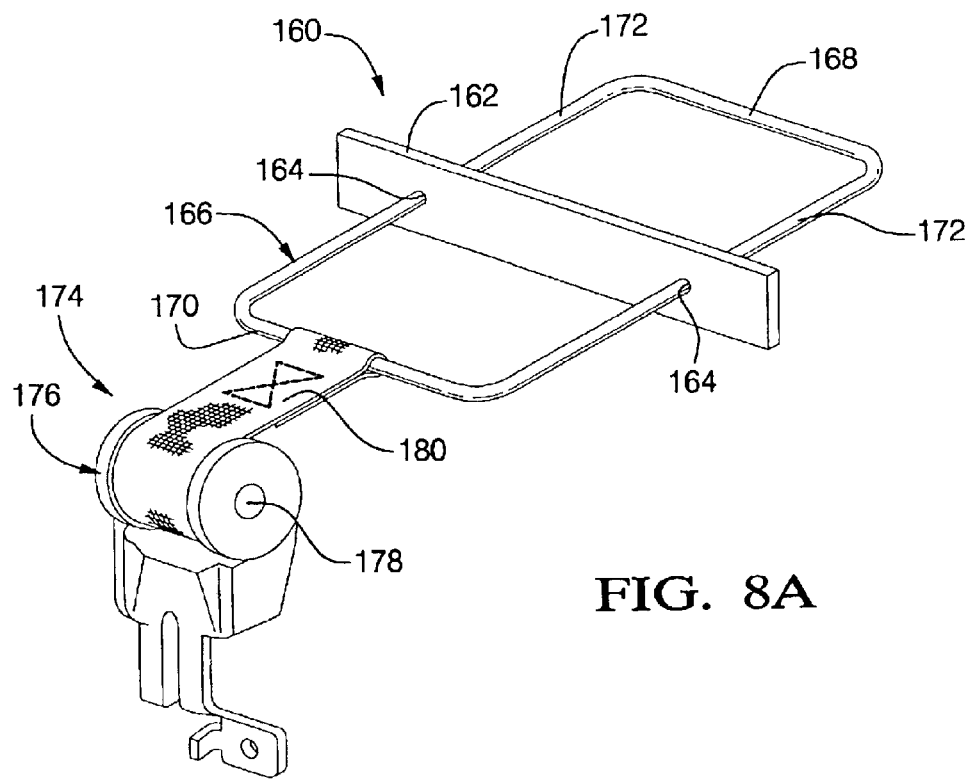
FIG. 8A is a perspective view of a sixth embodiment of a lower anchorage assembly.
Figure 8B:
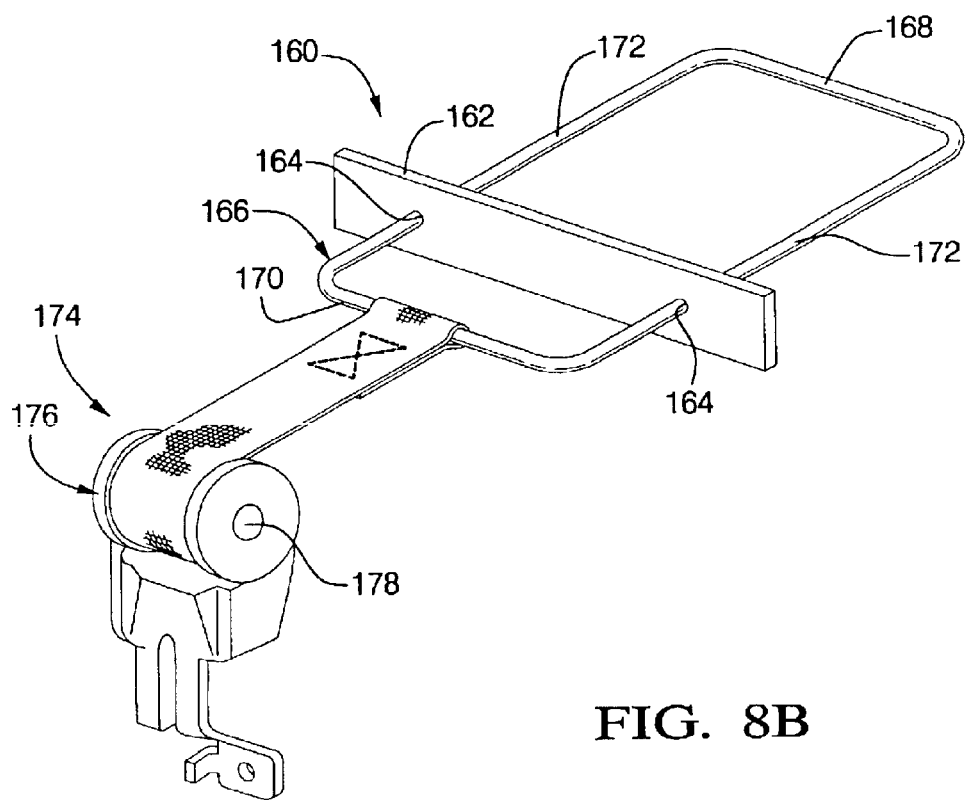
FIG. 8B is a perspective view of the invention of FIG. 8A shown in an activated state.

A sixth embodiment of the present invention, is shown in FIGS. 8A–B. A lower anchorage assembly 160 includes a steel attachment bracket 162, which is rigidly secured to the vehicle structure such as by welding or bolting. Two apertures 164 extend through opposite ends of the bracket. A rectangular anchor 166 of approximately six millimeter diameter includes a forward latching leg 168, a rearward EA attaching leg 170 and two lateral legs 172 slideably extending through the apertures 164 in the attachment bracket 162. Thus the anchor 166 may slide relative to the fixed attachment bracket 162.

The lower anchorage assembly 160 further includes an EA mechanism 174 comprised of a webbing payout device 176 and a torsion rod 178. One end of the torsion rod is rigidly attached to the seat structure or vehicle structure and the other end is rotatable. The payout device 176 is rotatable with the rotatable end of the torsion rod. This webbing payout device functions similarly to the seat belt retractors used in commonplace on automobiles today. Belt webbing 180 is wound around the torsion rod 178 at one end and wrapped and secured to the rearward attachment portion 170 of the anchor 166. The torsion rod is designed to have characteristics which permit deformation of the rod in response to a predetermined amount of force applied to the webbing to enable the sliding movement of the child seat along the vehicle seat. The key characteristics of the torsion rod are material strength and shear strength.

During normal vehicle travel, the torsion rod 178 is set to a locked position which is sufficient to resist movement of the child seat. During a collision event, the inertia of the child seat system generates a forwardly force on the torsion rod 178 through the anchor 166. If this force is below a predetermined level, then the torsion rod does not deform and release webbing. If the collision generates a force on the belt webbing 180 that is above the predetermined level, then the torsion rod 178 is deformed and the webbing is released thereby allowing the anchor 166 and the child seat to move forward. The child seat can move forward until the complete webbing has been paid out.

The deformation of the torsion rod is not instantaneous but instead occurs over a period of time providing a more gradual deceleration on the child seat. Further, the deformation of the torsion rod absorbs energy as the metal yields and bends.

Figure 9A:
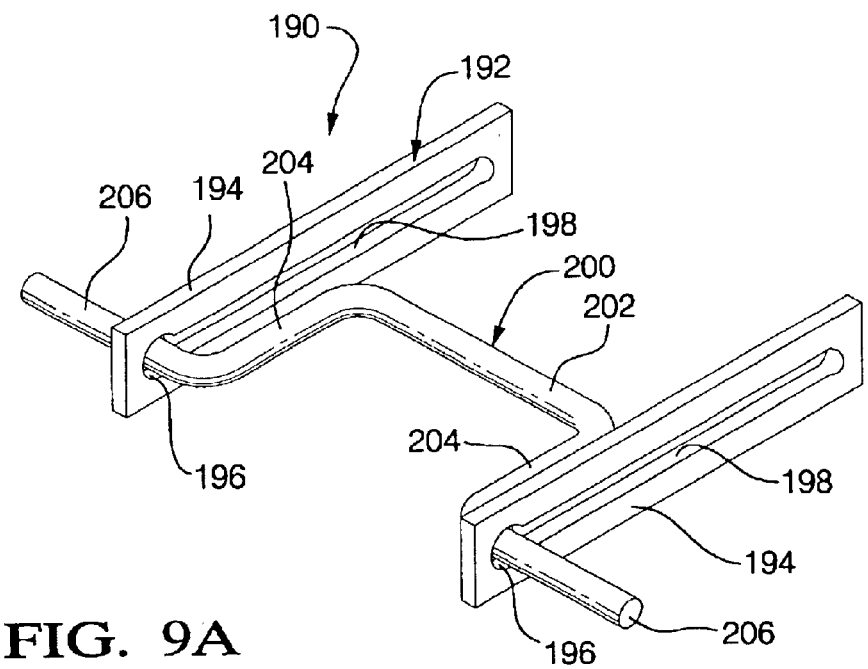
FIG. 9A is a perspective view of a seventh embodiment of a lower anchorage assembly.
Figure 9B:
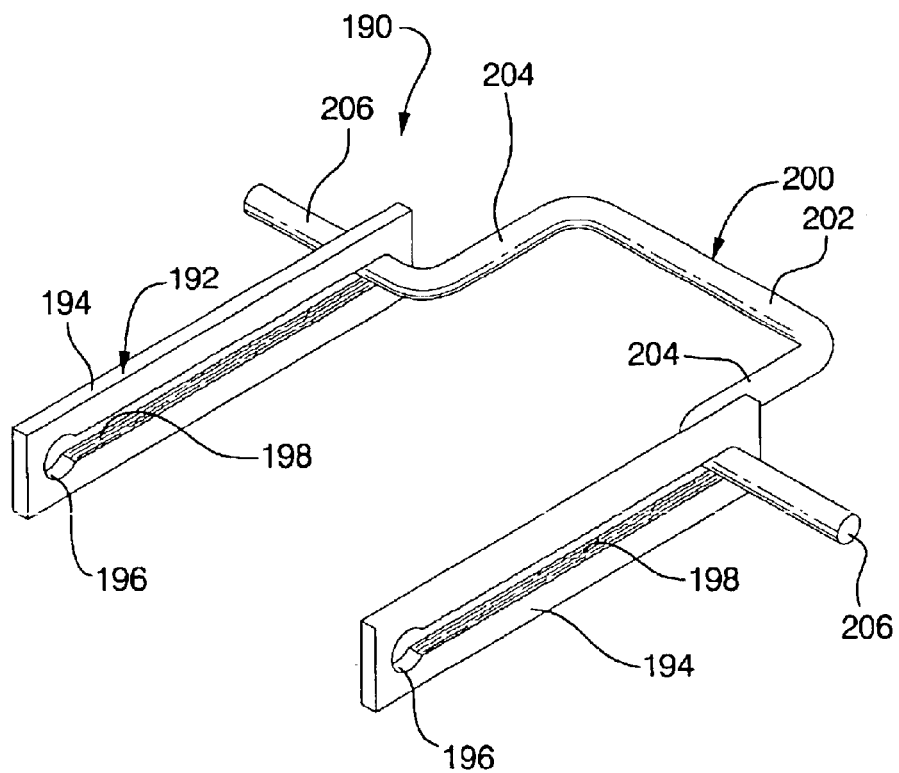
FIG. 9B is a perspective view of the invention of FIG. 9A shown in an activated state.

The last embodiment of a lower anchorage assembly is shown in FIGS. 9A–B. The lower anchorage assembly 190 is comprised of a steel attachment bracket 192 rigidly secure to the vehicle structure. The bracket 192 includes two parallel fore/aft plates 194, each having a keyhole 196 and slot 198. A C-shaped anchor 200 has a forward latchable portion 202 for releasable engagement with the corresponding child seat latch mechanism, not shown, and two rearwardly extending legs 204. At the end of each leg is a lateral flange 206, which is received within and protrudes through the keyhole 196 in the attachment bracket 192. The diameter of the lateral flange 206 is less than the diameter of the keyhole 196 but slightly greater than the width of the slot 198.

During normal vehicle travel, the anchor 200 is rigidly retained in the keyhole 196 of the attachment bracket 192. During a collision event, the inertia of the child seat system generates a forwardly force from the anchor flanges 206 on the attachment bracket 192 at the slot 198. If this force is below a predetermined level, then the anchor 200 is retained in the keyhole 196 and the child seat is prevented from moving forwardly relative to the vehicle seat.

If the predetermined forward force between the anchor flange 206 and the bracket 192 at the slot 198 is exceeded, then the anchor flange deforms the bracket material as it travels forward, enlarging the width of the slot. The child seat moves forward with the anchor 200 until the forward end of the slot is reached.

The deformation of the attachment bracket along the slot is the energy absorbing mechanism. This occurs over a period of time providing a more gradual deceleration on the child seat system.

Upper Anchorage Assembly

The discussion will now turn to specific embodiments to accomplish the energy absorbing upper anchorage assembly. Like the lower assemblies, the upper assemblies all have a portion fixed to the vehicle, a latch-receiving portion, and an energy absorbing mechanism.

Figure 10A:
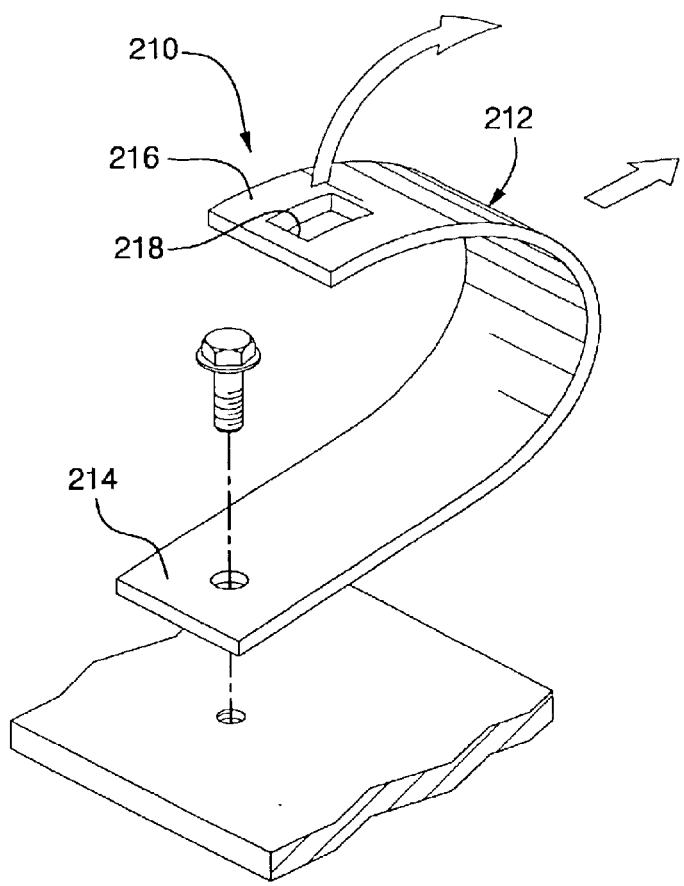
FIG. 10A is a perspective view of a first embodiment of an upper anchorage assembly.
Figure 10B:
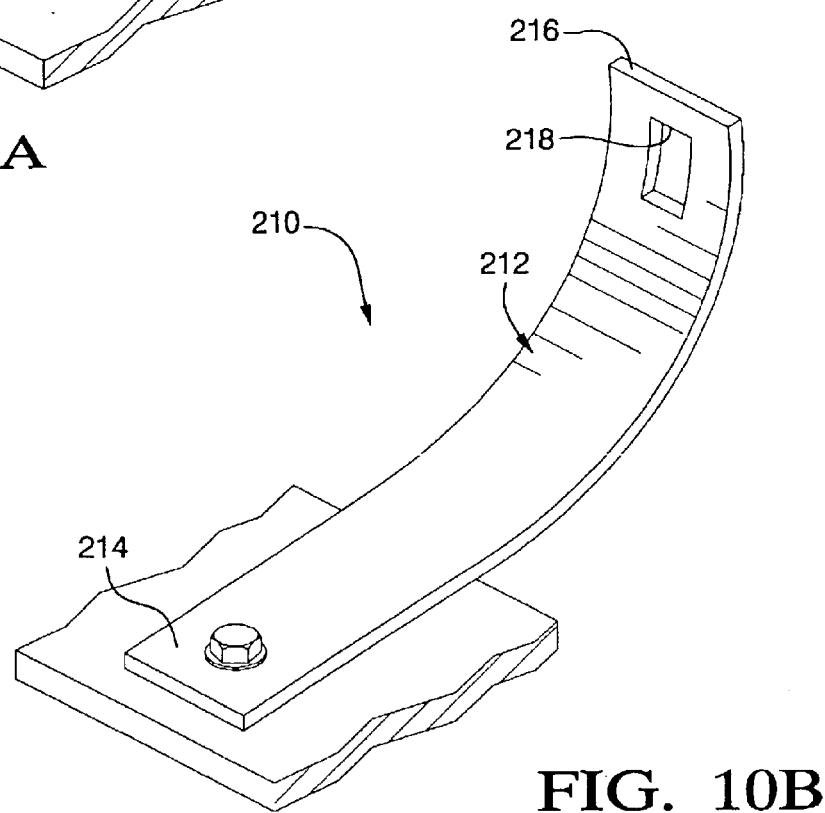
FIG. 10B is a perspective view of the invention of FIG. 10A shown in an activated state.

As shown in FIGS. 10A–B, a first embodiment of the upper anchorage assembly 210 includes a steel U-shaped bracket 212 positioned on its side, where the first and second ends 214,216 respectively of the bracket are rearward in the vehicle. The first end 214 of the bracket is secured to the vehicle such as to the horizontal package shelf 20, shown in FIG. 1 such as by bolting or welding. The second end 216 of the bracket is unrestrained and includes a latchable portion 218 for releasable engagement with the corresponding upper child seat latch.

The bracket's thickness, yield strength, elongation, and shape allow it to deform and bend forward in response to a predetermined amount of force applied to it enabling the sliding movement of the child seat along the vehicle seat.

During normal vehicle travel, the U-shaped bracket 212 is sufficiently rigid to resist movement of the child seat. During a collision event, the inertia of the child seat system generates a forwardly force applied to the second end 216 of the U-shaped bracket 212. If this force is below a predetermined force level, then the bracket 212 does not bend and the child seat is prevented from moving forwardly relative to the vehicle seat.

If the predetermined forward force is exceeded, then the U-shaped bracket 212 bends forward as shown in FIG. 10B and the child seat may travel forward until the bracket is fully deformed and straightened. The deformation of the bracket absorbs energy that would otherwise be absorbed by the child seat system.

Figure 11A:
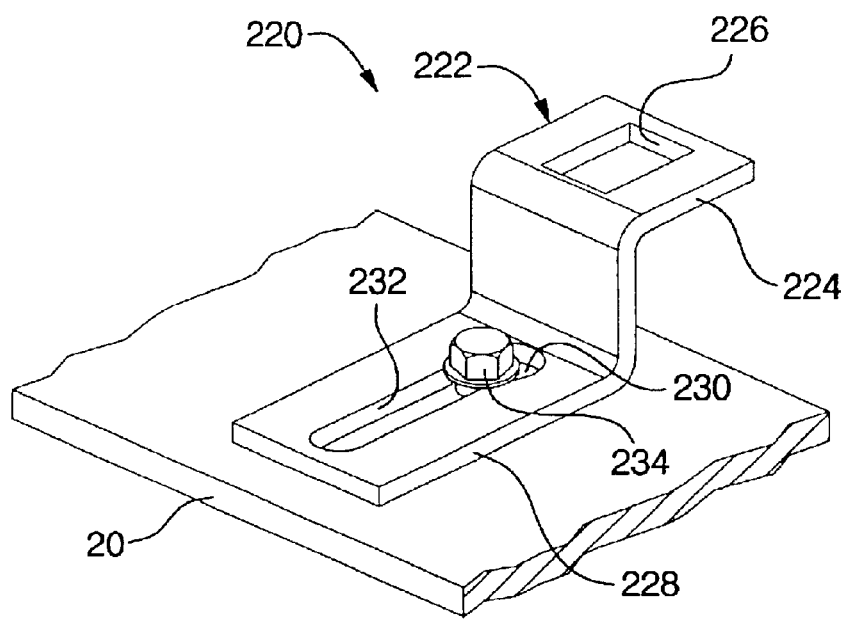
FIG. 11A is a perspective view of a second embodiment of an upper anchorage assembly.
Figure 11B:
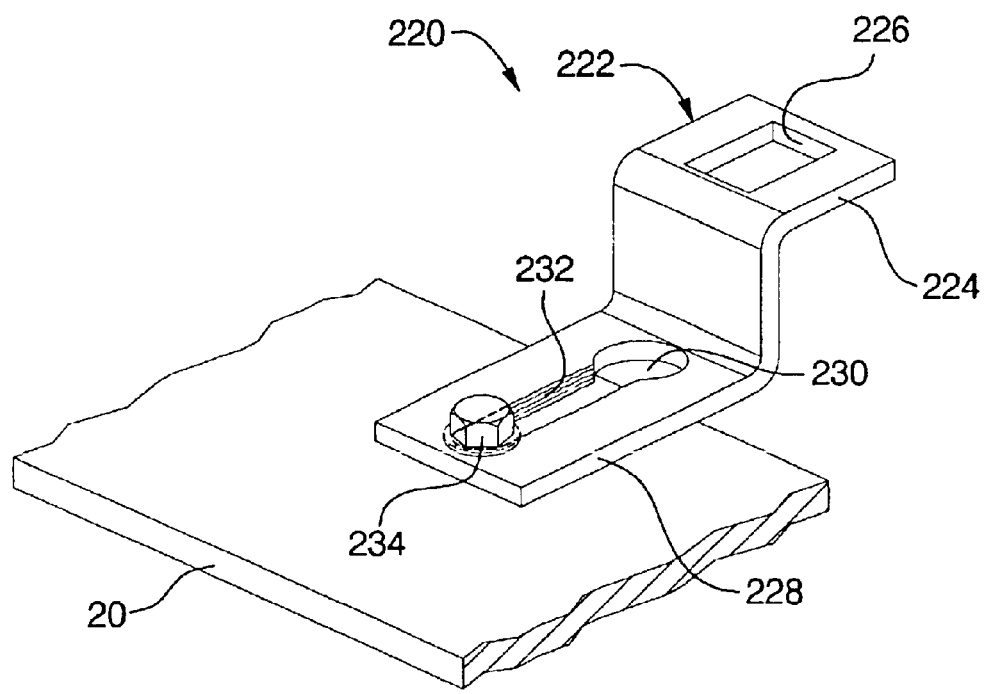
FIG. 11B is a perspective view of the invention of FIG. 11A shown in an activated state.

A second embodiment for the upper anchorage assembly 220 is shown in FIGS. 11A–B. Here the assembly includes a Z-shaped bracket 222 where a first end 224 includes a latch-receiving portion 226 and the second end 228 includes a longitudinally-arranged keyhole 230 and slot 232 with the keyhole forward of the slot. A bolt 234 extends through the keyhole 230 and engages vehicle structure such as the package shelf 20 shown in FIG. 1. The bolt diameter is greater than the width of the slot.

During normal vehicle travel, the bracket 222 is rigidly retained by the bolt 234 extending through the keyhole 230 to the vehicle structure and thus the child seat does not move. During a collision event, the inertia of the child seat system generates a forwardly force applied to the bracket 222 at its latch-receiving portion 226. If this force is below a predetermined level, then the bracket 222 remains bolted through the keyhole 230 and the child seat is prevented from moving forwardly relative to the vehicle seat.

If the predetermined forward force is exceeded, then the child seat pulls on the bracket 222 with sufficient force so that the fixed bolt 234 deforms the bracket material as it travels forward, enlarging the width of the slot 232. The child seat moves forward with the bracket until the rearward end of the slot is reached.

The deformation of the bracket along the slot is the energy absorbing mechanism. This occurs over a period of time providing a more gradual deceleration on the child seat system.

Figure 12A:
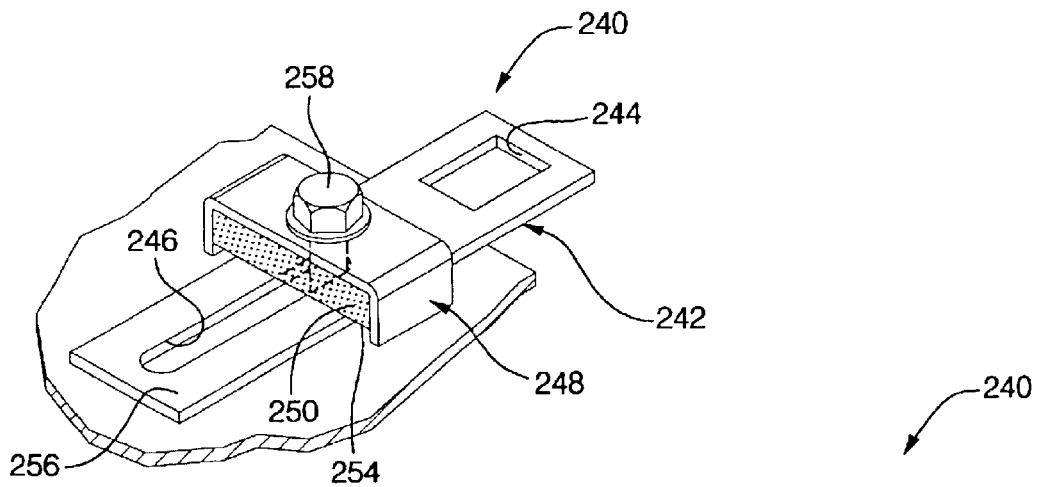
FIG. 12A is a perspective view of a third embodiment of an upper anchorage assembly.
Figure 12B:
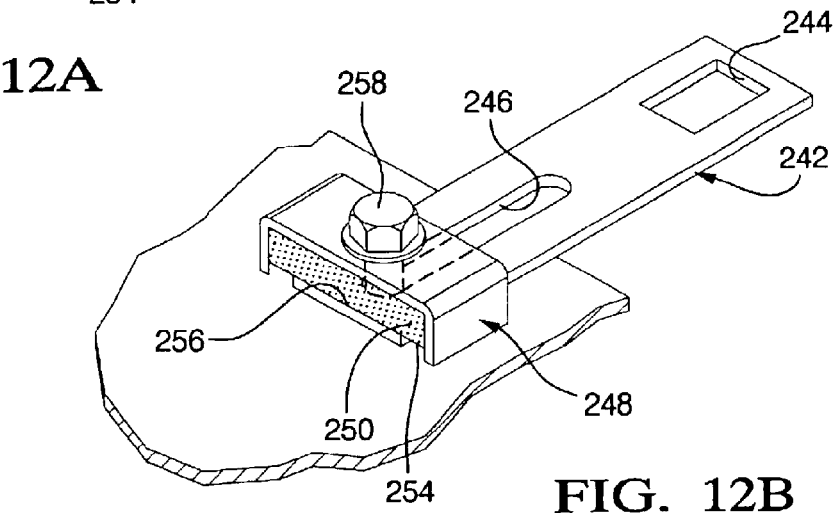
FIG. 12B is a perspective view of the invention of FIG. 12A shown in an activated state.
Figure 12C:
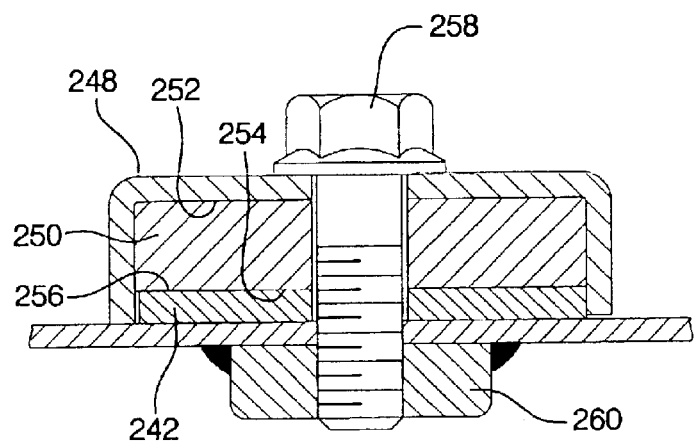
FIG. 12C is a section taken through line B—B in FIG. 12B.

A final embodiment of the upper anchorage assembly 240 is illustrated in FIGS. 12A–C. Here the assembly includes a steel flat plate 242 which includes a latch-receiving portion 244 and a longitudinally extending slot 246 rearward of the latchable portion. The assembly 240 also includes a steel inverted U-shaped clamp bracket 248, fitting over the width of the flat plate 242. A friction plate 250 is secured to the underside 252 of the clamp bracket 248 such as by a heat activated thermoset resin adhesive. The lower surface 254 of the friction plate 250 is in frictional surface engagement with the upper surface 256 of the flat plate. The friction plate 250 is a material with a relatively high coefficient of friction such as a metal impregnated ceramic brake pad material. A bolt 258 extends through clearance holes in the clamp bracket 248 and the friction plate 250 and through the slot 246 in the flat plate 242 to engage vehicle structure such as the package shelf 20 shown in FIG. 1. The diameter of the bolt is sized smaller than the width of the slot in the flat plate, thus permitting the flat plate 242 to slide relative to the bolt 258 in response to a predetermined force load. The clamp bracket 248 and friction plate 250 provide pressure on the flat plate 242 via the bolt 258 which is secured to the vehicle structure with a weld nut 260.

The key characteristics are the coefficients of friction of the flat plate and the friction plate, as well as the clamping force.

During normal vehicle travel, the friction between the flat plate 242 and the friction plate 250 is sufficiently high to prevent movement of the child seat. During a collision event, the inertia of the child seat system generates a forwardly force applied to the flat plate 242. If this force is below a predetermined friction force level applied to the flat plate 242, then the flat plate remains fixed and the child seat does not translate.

If the predetermined forward force is exceeded, then the friction force applied by the friction plate 250 and clamping bracket 248 is overcome and the flat plate 242 translates forward relative to the bolt 258 since the slot 246 is larger than the bolt. The child seat accordingly translates forward until the bolt contacts the end of the slot in the flat plate.

The upper anchorage assemblies may be fixed to a rear package shelf as illustrated and described. But the concepts are equally applicable to an upper assembly which is mounted to the rear of the vehicle seat or the vehicle floor behind the seat as is done in some utility or van vehicles.

The vehicle anchorage system may include EA mechanisms in one or both the upper and lower anchorage assemblies. Further the predetermined thresholds for each may be the same or different. The energy absorption characteristics of the mechanism may be constant, increasing or decreasing over time. The energy absorbing rate is accomplished in various ways depending on the actual EA mechanism employed.

The foregoing description of the preferred embodiment of the invention has been presented for the purpose of illustration and description. It is not intended to be exhaustive, nor is it intended to limit the invention to the precise form disclosed. It will be apparent to those skilled in the art that the disclosed embodiment may be modified in light of the above teachings. The embodiment was chosen to provide an illustration of the principles of the invention and its practical application to thereby enable one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

What is claimed is:

1. A vehicle having a vehicle structure including a vehicle seat having a seat back and a seat cushion intersecting at a seat bight, and a vehicle anchorage system for securing a child seat on the vehicle seat, comprising:
   a lower anchorage assembly having a fixed member secured to the vehicle structure, an anchor having a latchable portion for releasable engagement with a lower child seat tether hook at the seat bight and wherein the anchor is slideably received by the fixed member, and an energy absorbing mechanism operable above a predetermined force threshold to provide a limited forward displacement of the anchor and the child seat latched thereto and the energy absorbing mechanism is comprised of a reaction portion secured to and moveable with the anchor, and an energy absorbing portion disposed between the fixed member and the reaction portion, which operates to absorb energy when the reaction portion applies a force thereto; and
   an upper anchorage assembly having a fixed portion secured to the vehicle structure, and a latchable portion for releasable engagement with an upper child seat tether hook.

2. A vehicle, as defined in claim 1, wherein the energy absorbing portion is comprised of pleated bellows which operate to compress between the reaction portion and the fixed member when the anchor applies a force above the predetermined threshold.

3. A vehicle, as defined in claim 1, wherein the energy absorbing portion is comprised of a crushable block which deforms between the reaction portion and the fixed member when the anchor applies a force above the predetermined threshold.

4. A vehicle, as defined in claim 1, wherein the fixed member is a cylinder having closed ends, the reaction portion is a piston disposed in the cylinder with the anchor acting as a piston stem, and the energy absorbing portion is a compressible fluid disposed in the cylinder which operates to absorb energy when the piston applies a force above the predetermined threshold.

5. A vehicle, as defined in claim 1, wherein the fixed member is a cylinder having closed ends, the reaction portion is a piston disposed in the cylinder with the anchor acting as a piston stem, the piston having a restrictive orifice therethrough, and the energy absorbing portion is a fluid disposed in the cylinder which operates to absorb energy as the fluid is displaced through the orifice when the piston applies a force above the predetermined threshold.

6. A vehicle having a vehicle structure including a vehicle seat having a seat back and a seat cushion intersecting at a seat bight, and a vehicle anchorage system for securing a child seat on the vehicle seat, comprising:
   two lower anchorage assemblies each having a fixed member secured to the vehicle structure, an anchor having a latchable portion for releasable engagement with a lower child seat tether hook at the seat bight, and an energy absorbing mechanism operable above a first predetermined force threshold to provide a limited forward displacement of the anchor and the lower child seat tether hook; and
   an upper anchorage assembly having a fixed portion secured to the vehicle structure, a latchable portion for releasable engagement with an upper child seat tether hook, and an energy absorbing mechanism operable above a second predetermined force threshold to provide a limited forward displacement of the latchable portion and the upper child seat tether hook;
   wherein the upper anchorage assembly includes a flat plate having the latchable portion and a longitudinally extending slot rearward of the latchable portion, the fired portion includes a U-shaped clamp bracket, a friction plate fixed to an underside of the clamp bracket, and a bolt extending through the clamp bracket, the friction plate and the slot in the flat plate and is secured to the vehicle structure, wherein the flat plate may translate relative to the bolt, and the energy absorbing mechanism is provided by frictional interference between the friction plate and the flat plate such that a frictional force must exceed the predetermined threshold in order for the flat plate to translate.

* * * * *